(12) United States Patent
Frank et al.

(10) Patent No.: US 6,202,715 B1
(45) Date of Patent: Mar. 20, 2001

(54) FEEDING DEVICE FOR FUEL

(75) Inventors: Kurt Frank, Schorndorf; Hans-Peter Braun, Renfrizhausen; Dieter Schreckenberger, Marbach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/536,112

(22) Filed: Mar. 27, 2000

(30) Foreign Application Priority Data

Mar. 27, 1999 (DE) .............................. 199 14 062

(51) Int. Cl.$^7$ .......................................... B65B 1/04
(52) U.S. Cl. .................... 141/348; 141/285; 220/86.2; 137/590
(58) Field of Search .................... 141/348, 285, 141/286; 137/590–592; 220/86.2

(56) References Cited

U.S. PATENT DOCUMENTS 2,719,583 * 10/1955 Malick .
4,703,771 * 11/1987 Mimura .
4,951,699 * 8/1990 Lipman .

FOREIGN PATENT DOCUMENTS 44 44 854 A1    6/1996 (DE) .

* cited by examiner

Primary Examiner—Steven O. Douglas
(74) Attorney, Agent, or Firm—Michael J. Striker

(57) ABSTRACT

A feeding device for fuel has a tank, a feeding pipe driven by an electric motor, a first reservoir for fuel arranged in a region of the feeding pipe so that fuel fills the first reservoir from the tank and is supplied to the feeding pump, at least one further reservoir which is offset from the first reservoir and coupled with the later, and a connecting conduit which connects the further reservoir with the first reservoir.

9 Claims, 2 Drawing Sheets

FEEDING DEVICE FOR FUEL

BACKGROUND OF THE INVENTION

The present invention relates to a feeding device for fuel.

The feeding devices for fuel are known, in which the fuel is fed from a fuel tank, for example to an injection system of a combustion engine of a motor vehicle.

One of such feeding devices is disclosed for example in the German patent document DE 44 44 854 A1. In this feeding device the feeding pump is driven by an electric motor and the fuel flows from the feeding pipe through a prefilter, and after the feeding pump is guided under the feeding pressure through a main filter. These components are arranged in a filter cup with a removable cover. The electric motor and the feeding pump are located in a central chamber and the main filter is located in a ring chamber which is concentric to the central chamber.

Connectors for tubular connections or pressure hoses are provided on the cover of the filter cup of this known arrangement. Fuel is guided through them to a connection change of the fuel tank. The feeding device therefore forms a complete feeding module which can be directly assembled in the fuel tank. The fuel is aspirated in the fuel tank under the feeding module and can be supplied above from the connection flange on the cover of the fuel tank through a feeding conduit to the combustion engine.

In such feeding devices there is a problem that in the case of low tank level and during curved travels of the vehicle, when the fuel is sloshed back from the feeding pump, a sufficient quantity of fuel is not available to guarantee a continuous feeding to the combustion engine. In the prior art this problem is solved for example by an additional reservoir which is arranged around the feeding pump and in some cases can be filled by an additional suction jet pump. In this situation the structural space which is available in the vehicle has a critical value for forming a sufficiently large reservoir to be available for this purpose.

SUMMARY OF THE INVENTION

It is therefore an object of the present invention to provide a feeding device for fuel, which avoids the disadvantages of the prior art.

In keeping with these objects and with others which will become apparent hereinafter, one feature of present invention resides, briefly stated, in a feeding device for fuel in which, in addition to a first reservoir, at least one further reservoir is available, which is offset from the first reservoir and coupled with it through a connecting conduit. Thereby an increased reservoir volume can be provided by the greater variability in suitable geometrical conditions in the tank.

This arrangement can be realized in a simple way, when the geodatic height of the reservoir is higher than the geodatic height of the connecting conduit, so that an exchange of fuel through the connection conduits is performed in accordance with the principle of the communicating pipes. It is therefore guaranteed that the reservoirs which are arranged in different regions of the tanks spaced far from one another, are hydraulically connected with one another so as to operate as a single reservoir.

When a so-called multi-chamber or saddle tank is utilized in many cases due to an optimal use of the critical space for the tank, it is guaranteed with the invention that a hydraulic exchange of the fuel through the connecting conduit is performed between the at least two reservoirs through a saddle-shaped raised part.

It is possible to provide the required filling device of the reservoirs on each of reservoirs. Preferably however an arrangement is selected in which the filling pipe of the tank for the fuel is provided on the closest reservoir with a filling valve or flap.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
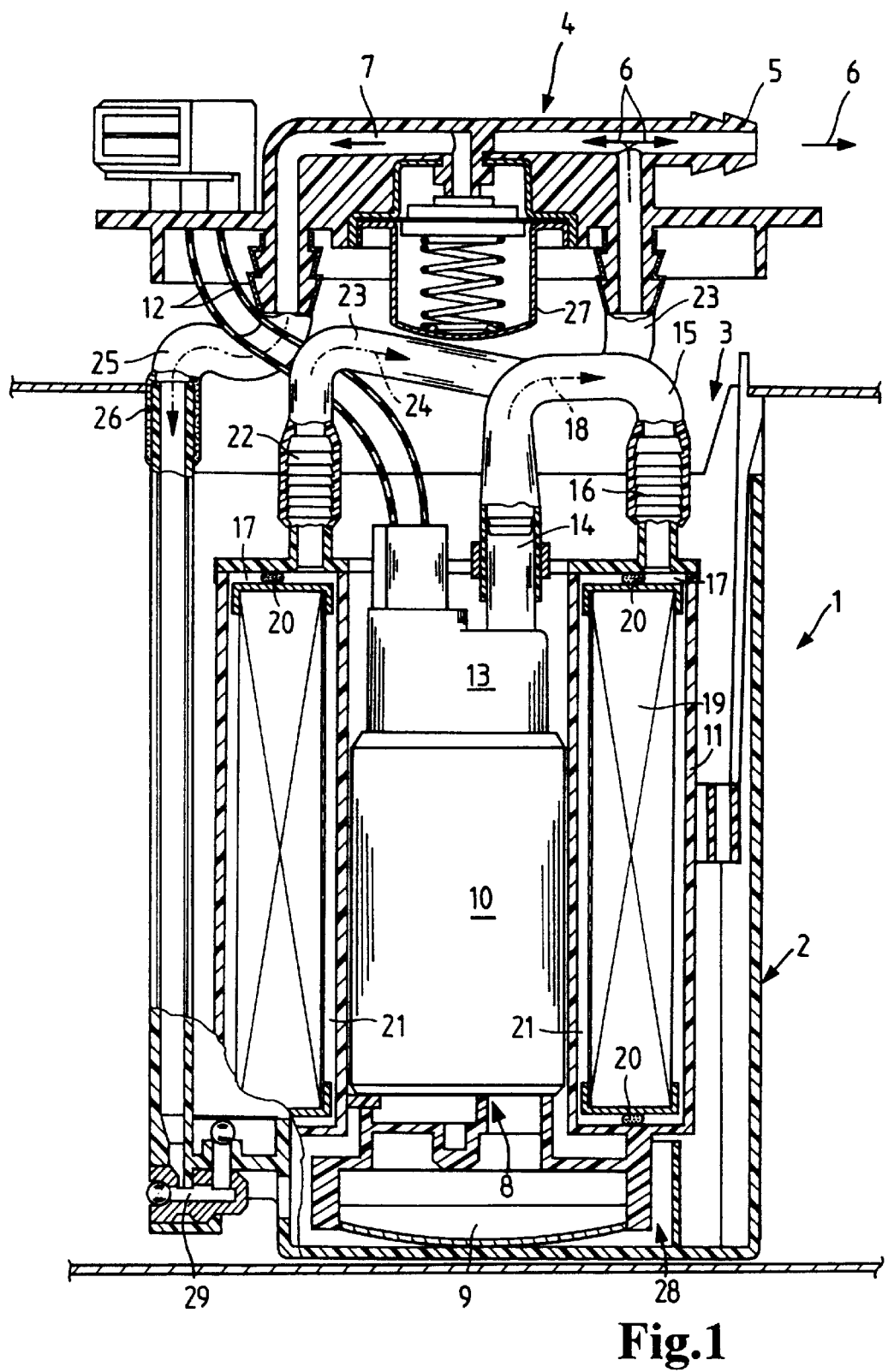
FIG. 1 is a view showing a section of a feeding device for fuel in accordance with the prior art, which is premounted in a fuel tank.

In FIG. 1 which shows the prior art construction, a fuel tank is identified with reference numeral 1, and a feeding device 2 is arranged in the fuel tank as disclosed in the German patent document DE 44 44 854 A1. The feeding device 2 can be inserted in the fuel tank from above through an opening 3 of the fuel tank 1. The opening 3 is closeable with a tank flange 4. A connection pipe 5 for a not shown feeding conduit is located on the tank flange 4. The feeding conduit leads to a combustion engine of a motor vehicle and transports the fuel in direction of the arrow 6. Furthermore, the tank flange 4 has a connection for a fuel return conduit 7 which comes from the combustion engine and a pressure regulator 27, whose operation is not important for understanding of the invention.

The feeding device 2 has an electric fuel pump (EFP) 10 which forms a feeding pump and is located in the lower region. The pumping element 8 is driven by an electric motor as a component of the pump 10, which is located centrally in a filter cup 11 as a housing. The electric motor of the electric fuel pump is supplied with electrical voltage through connecting conductors 12 and control led through them. The tubular connection 15 is connected to a connection pipe 14 of the electric fuel pump 10. The fed fuel flows through the tubular connection 15 via a connection pipe 16 into an outer chamber 17 of the filter cup 11 in direction of the arrow 18.

A main filter element 19 is located in the filter cup 11 concentrically to the central chamber with the electric fuel pump 10. It is subdivided by the ring seals 20 of the filter cup 11 into an outer chamber 17 and an inner chamber 21. Fuel which is filtered during passage through the filter element 19 flows from the inner chamber 21 to a connection pipe 22. A tubular connection 23 is connected to the connection pipe 22 and produces a connection to the tank flange 4. Therefore the fuel can flow in direction of the arrows 24 and 6 from the inner chamber 21 into the filter cup 18 to the outer feeding conduit.

A closed reservoir 28 is formed in the region of the aspiration of the fuel tank between the suction pipe of the electric fuel pump 10 and the tank 1. In accordance with the prior art, in the reservoir 28 the fuel is fed with a suction jet pipe as a filling device 29.

In FIG. 1 which illustrates a first embodiment of the feeding device of the invention, the feeding device for fuel is provided with an electric fuel pump 10. The electric fuel pump 10 and its arrangement substantially correspond to those of FIG. 1. Therefore the arrangement is illustrated in FIG. 2 in a simplified manner and provided with corresponding reference numerals.

Figure 2:
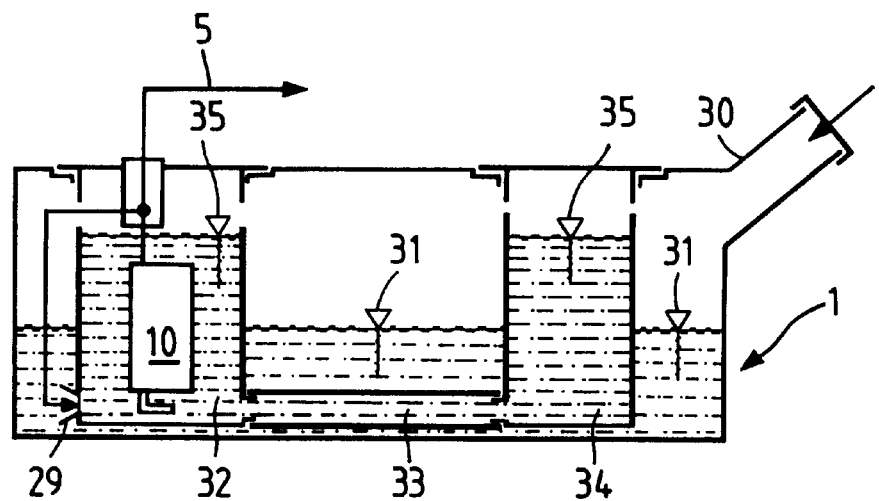
FIG. 2 is a view showing a feeding device for fuel in accordance with a first embodiment of the present invention, with two hydraulically coupled reservoirs.

The feeding device shown in FIG. 2 is arranged in the tank 1 in the region facing away from a filling pipe 30. Fuel fills a first reservoir 32 through the filling device 29. The filled fuel is distributed via a connecting conduit 33 into a second, offset reservoir 34. Since the connection conduit 33 and the reservoirs 32 and 34 operate in accordance with the principal of the communicating pipes, a coinciding fuel level 35 is provided.

Figure 3:
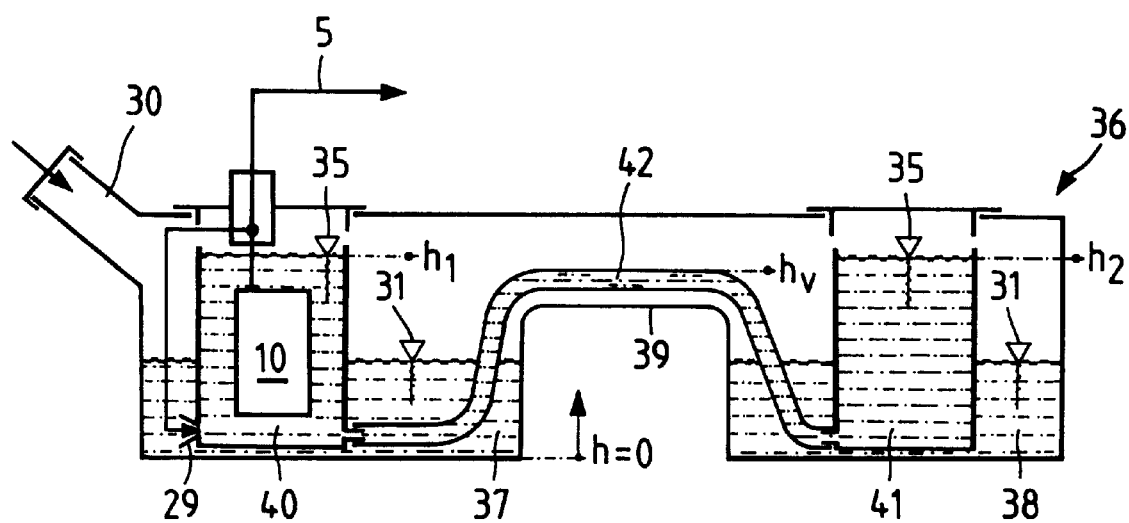
FIG. 3 is a view showing a second embodiment of the inventive feeding device for fuel with two hydraulically coupled reservoirs in a multi-chamber or saddle tank.

FIG. 3 shows a second embodiment of the inventive arrangement of a feeding device. In contrast to FIG. 2, it has a multi chamber or a saddle tank 36. A first chamber 37 is provided in the region of the feeding device and the filling pipe 30 and a second chamber 38 is located at the side which is opposite to the filling pipe 30. The chambers 37 and 38 are connected with one another through a saddle 39, and an identical fuel level 31 can be adjusted.

A reservoir 40 is arranged in the chamber 47 and a reservoir 41 is arranged in the chamber 38. The reservoirs 40 and 41 are connected with one another through a connecting conduit 42 in accordance with the principle similar to FIG. 2. The principle of the communicating pipes operate here in the above described manner when the height h1 in the reservoir 40 and the height h2 in the reservoir 41 are higher than the height $h_v$ of the connection conduit 42 with respect to the bottom of the tank 36 at the height h=0.

It will be understood that each of the elements described above, or two or more together, may also find a useful application in other types of constructions differing from the types described above.

While the invention has been illustrated and described as embodied in feeding device for fuel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A feeding device for fuel, comprising a tank; a feeding pipe driven by an electric motor; a first reservoir for fuel arranged in a region of said feeding pipe so that fuel fills said first reservoir from said tank and is supplied to said feeding pipe; at least one further reservoir which is offset from said first reservoir and coupled with the later; and a connecting conduit which connects said further reservoir with said first reservoir.

2. A feeding device as defined in claim 1, wherein said reservoir has geodatic heights which are greater than a geodatic height of said connecting conduit, and an exchange of fuel through said connecting conduit being performed in accordance with the principal of communicating pipes.

3. A feeding device as defined in claim 1; and further comprising a saddle located between said reservoirs, said connecting conduit being guided over said saddle.

4. A feeding device as defined in claim 1; and further comprising a filling pipe provided in said tank; and a filling element which is arranged on one of said reservoirs which is closest to said filling pipe of said tank.

5. A feeding device as defined in claim 4, wherein said filling element is formed as an a filling valve.

6. A feeding device as defined in claim 4 wherein said filling element is formed as a filling flap.

7. A feeding device as defined in claim 1, wherein each of said reservoirs is provided with a filling element for filling said reservoirs.

8. A feeding device as defined in claim 7, wherein said filling element is formed as a filling valve.

9. A feeding device as defined in claim 7, wherein said filing element is formed as a filing flap.

* * * * *